US012196405B2

(12) United States Patent
Xiao et al.

(10) Patent No.: US 12,196,405 B2
(45) Date of Patent: Jan. 14, 2025

(54) LIGHTING DEVICE FOR FREEZER

(71) Applicant: ENERGYLED ELECTRONICS CORPORATION, Zhaoqing (CN)

(72) Inventors: Deliang Xiao, Zhaoqing (CN); Qing Ma, Zhaoqing (CN); Kegang Yue, Zhaoqing (CN)

(73) Assignee: ENERGYLED ELECTRONICS CORPORATION, Zhaoqing (CN)

( * ) Notice: Subject to any disclaimer, the term of this patent is extended or adjusted under 35 U.S.C. 154(b) by 0 days.

(21) Appl. No.: 18/345,688

(22) Filed: Jun. 30, 2023

(65) Prior Publication Data

US 2024/0337376 A1 Oct. 10, 2024

(30) Foreign Application Priority Data

Apr. 10, 2023 (CN) ........................ 202320782868.6

(51) Int. Cl.

| | |
|---|---|
| ***F21V 33/00*** | (2006.01) |
| ***F21S 4/28*** | (2016.01) |
| ***F21V 5/00*** | (2018.01) |
| ***F21V 17/16*** | (2006.01) |
| ***F21V 21/30*** | (2006.01) |
| ***F21V 29/70*** | (2015.01) |

(52) U.S. Cl.

CPC ............ *F21V 33/0044* (2013.01); *F21S 4/28* (2016.01); *F21V 5/002* (2013.01); *F21V 17/164* (2013.01); *F21V 21/30* (2013.01); *F21V 29/70* (2015.01)

(58) Field of Classification Search

CPC .......... F21S 4/28; F21V 21/30; F21V 17/164; F21V 5/002; F21V 29/30; F21V 33/0044

See application file for complete search history.

(56) References Cited

FOREIGN PATENT DOCUMENTS

| | | | | |
|---|---|---|---|---|
| CN | 107816667 A | * | 3/2018 | ................ F21S 8/00 |
| DE | 202010011614 U1 | * | 11/2010 | ........... A47F 3/0482 |
| WO | WO-2020194659 A1 | * | 10/2020 | |

OTHER PUBLICATIONS

Espace.net EP3489581A1, Description translation (Year: 2024).*
Innovation Q+ NPL Search (Year: 2024).*

* cited by examiner

*Primary Examiner* — Anabel Ton
(74) *Attorney, Agent, or Firm* — MUNCY, GEISSLER, OLDS & LOWE, P.C.

(57) ABSTRACT

A lighting device suitable for freezers includes a housing and a light source arranged in the housing. The lighting device further includes a light-transmitting member arranged within the light-emitting range of the light source. The light-transmitting member includes a first light-transmitting portion for irradiating the upper portion of the freezer, a second light-transmitting portion for irradiating the middle of the freezer, and a third light-transmitting portion for irradiating the lower portion of the freezer. The light-emitting surfaces of the first light-transmitting portion and the second light-transmitting portion are planes and the light-emitting surface of the third light-transmitting portion is in form of a stepped surface. The lighting device of the present disclosure makes items in the freezer irradiated more evenly, significantly convenient for the users.

19 Claims, 6 Drawing Sheets

LIGHTING DEVICE FOR FREEZER

CROSS REFERENCE TO RELATED APPLICATIONS

The present application claims priority from Chinese Application No. CN 202320782868.6, filed on Apr. 10, 2023, all of which are hereby incorporated herein by reference.

TECHNICAL FIELD

The present disclosure relates to the field of household appliances, and more particularly, relates to a lighting device suitable for a freezer.

BACKGROUND

Nowadays, freezers have become indispensable household appliances. As well known, with requirement of users, the capacity thereof has been becoming greater and greater. However, the freezer generally has only one light source inside, and the light source is typically installed on the top of the freezer, such configuration thus can only illuminate items on the upper portion of the freezer, regardless of items on the middle and lower portion of the freezer, thus resulting in remarkable inconvenience in use, especially for the freezers with large capacity.

SUMMARY

The present disclosure thus provides an improved lighting device suitable for freezers, which is capable of illuminating the items in the whole more evenly, extraordinarily convenient for users.

According to the present disclosure, the lighting device includes a housing and a light source arranged in the housing. The lighting device further includes a light-transmitting member arranged within the light-emitting range of the light source. The light-transmitting member includes a first light-transmitting portion for irradiating the upper portion of the freezer, a second light-transmitting portion for irradiating the middle of the freezer, and a third light-transmitting portion for irradiating the lower portion of the freezer. The light-emitting surfaces of the first light-transmitting portion and the second light-transmitting portion are flat surfaces, while the light-emitting surface of the third light-transmitting portion is in form of a stepped surface.

The lighting device is usually installed on the top of the freezer, so that light emitted from the light source basically irradiates all the shelves in the freezer. The light-transmitting member is made of a material with LENS optical properties according to the present disclosure. As the lighting device is arranged on the top of the freezer, closer to the shelves at the middle and upper portion, which can be irradiated directly, the first light-transmitting portion and the second light-transmitting portion with flat light-emitting surfaces are thus sufficient to irradiate the shelves at the middle and upper portion according to the present disclosure. Preferably, when in use, the light-emitting surfaces of the first light-transmitting portion and the second light-transmitting portion are arranged at an angle relative to the shelves, with the angle $\beta$=130°-150°.

According to the present disclosure, in order to adequately irradiate the shelves at lower portion of the freezer, the light-emitting surface of the third light-transmitting portion is designed into a stepped surface. Such superposed stepped light-emitting surface can achieve light superposition and enhance illumination. Due to the refraction of the light-transmitting member with LENS optical properties, visual effects of multiplier increase of light spots thus can be obtained inside of the freezer, while without increase of the light source. In the present disclosure, the third light-transmitting portion is used for irradiating the shelves and items thereof at the lower portion of the freezer. Although the distance from the light source is large, due to the visual effects of multiplier increase of light spots, lighting effect comparable to that at the middle and upper portion can be obtained, thus making the items in the freezer irradiated more evenly, significantly convenient for users. Since less shelves at the lower portion of the freezer are usually arranged, the third light-transmitting portion is preferably provided with 2-5 steps, which can result in less production cost.

It is advantageous for the light-emitting surfaces of the first light-transmitting portion, the second light-transmitting portion, and the third light-transmitting portion to be frosted. Frosting treatment can eliminate the problem of yellow circles generated around the edges after refraction of the light-transmitting member with the LENS optical properties, thereby making the illumination color more uniform and reducing color distortion of the items in the freezer.

According to an embodiment of the present disclosure, the cross section of the light-transmitting member is formed into a structure with a narrower upper portion and a wider lower portion. The upper portion of the light-transmitting member is provided with a light-transmitting cavity for accommodating the light source. The bottom surface of the light-transmitting cavity and the light-emitting surfaces of the first light-transmitting portion and the second light-transmitting portion forms an angle $\gamma$=10°-20°.

Preferably, the light-transmitting member has an inclined plane structure on both sides of the cross section, with an inclined angle $\alpha$=60°-90°.

According to the present disclosure, the cross section of the light-transmitting member is substantially in trapezoidal shape, with the upper portion narrower and the lower portion wider. The top of the trapezoid is provided with a groove-shaped light-transmitting cavity. The bottom surface of the groove-shaped light-transmitting cavity is inclined relative to the light-emitting surfaces of the first light-transmitting portion and the second light-transmitting portion, forming an angle $\gamma$=10°-20°. It is preferable that when in use, after the lighting device is installed on the freezer, the bottom surface of the groove-shaped light-transmitting cavity is arranged to extend outward and downward with respect to the shelves. Such configuration of the light-transmitting cavity can ensure that more light emitted therethrough will fall into the third light-transmitting portion to emit, thereby boosting the visual effects of irradiating the lower portion of the freezer. In order to play full use of the light source at the maximum, the lighting device is preferably arranged on the top surface of the freezer to irradiate the shelves at an angle. The light-transmitting member does this with both sides of the cross section thereof being inclined planes, which can obtain large-angle irradiation while reducing volume of the lighting device. The angle formed by the inclined planes of the light-transmitting member is preferable $\alpha$=60°-90°.

It is preferable that the transverse light outgoing width B1 of the first light-transmitting portion, the transverse light outgoing width B2 of the second light-transmitting portion, and the transverse light outgoing width B3 of the third light-transmitting portion satisfy $B1<B3<B2$.

The lighting device can further include a light tube arranged in the housing. The light tube specifically includes a heat dissipation portion, a first installing portion, and a second installing portion. The heat dissipation portion is provided with a heat dissipation cavity for dissipating heat during operation of the light source. The first installing portion is used for installing the light source and in air communication with the heat dissipation cavity. The second installing portion is provided with an installing cavity for installing the light-transmitting member, and the second installing portion has a flat light-transmitting surface parallel to the light-emitting surfaces of the first light-transmitting portion and the second light-transmitting portion and an inclined light-transmitting surface for the third light-transmitting portion to emit light.

In the present disclosure, the light source may be composed of a PCB and light beads. The PCB is installed in the first installing portion and abutted against the top of the light-transmitting member, making the light beads fall into the range of the light-transmitting cavity of the light-transmitting member to ensure that the light emitted by the light beads all passes through the light-transmitting member. The heat generated during use can be dispersed from the interior of the heat dissipation cavity. After the light-transmitting member is finished installing in the second installing cavity, the light-transmitting plane is preferably parallel to the light-transmitting plane of the first light-transmitting portion and the second light-transmitting portion. Such configuration can reduce the possible halation, facilitating uniform light emission.

In order to achieve tightness of the light tube and rotatable mounting thereof, the lighting device may further include two sets of side covers and bases, which respectively arranged at both ends of the housing. The two side covers are used for sealing the light tube, and the light tube is rotatably arranged in the freezer by means of the bases. The side covers 6 can ensure the tightness of the light tube 2 to achieve dampproof property. With configuration of the bases 7, the lighting device can be rotatably arranged in the freezer, which facilitates adjusting the light-emitting angle to be applicable to freezers in different sizes and different models, thus augmenting the adaptability of the lighting device.

The base may specifically include a base plate and a clamping element, and the side cover can be arranged between the base plate and the clamping element. Especially, the clamping element can be formed into a Q-shaped structure. In this case, the light tube can be arranged at the arched portion of the Q-shaped structure via the side covers, and finally fixed in the freezer through the base plates.

According to one embodiment of the disclosure, the base plate and the clamping element are connected on one side by a flexible element and fastened on the other side by a fastener. In such configuration, during mounting, it is only needed to fix the base plate to the freezer first, and then place the light tube between the base plate and the clamping element, and both hands can be released after the fastener is fastened. To further ensure the fixing effect, the base plate and the clamping element can be tightened by screws.

The side cover may include a cap and a rotating shaft according to the present disclosure.

The rotating shaft is rotatably arranged between the base plate and the clamping element. The cap has a scale mark arranged on the side surface thereof, the clamping element is correspondingly provided with an indentation portion coordinated with the scale mark. In this way, after installation, by rotating the side cover and the light tube, the position of the indentation portion pointing to the scale mark will change, such as with scales at an interval of 5°, thereby making the angle to be adjusted be seen visually through the scale.

To save space required for installing the lighting device and simultaneously achieve better lighting effects, the housing according to the present disclosure may include an upper housing for being fixed in the freezer when installing to the freezer, which has a housing installing surface, and a lower housing having a housing light-emitting surface, and he housing light-emitting surface is arranged in an inclined way relative to the housing installing surface.

According to the present disclosure, the third light-transmitting portion of the stepped structure can realize light superposition and enhanced illumination, with visual effects of light spots in multiplier increase. Therefore, the lighting effect at the lower portion of the freezer comparable to that on the middle and upper portion thus can be achieved, making the items in the freezer irradiated more evenly, which is exceedingly convenient for users. During installation, no more person is needed to cooperate for installation, and only one person can finish installation of the lighting device independently. What's more, the housing can be rotated by the users to adjust the light-emitting angle at any time to achieve the optimal illumination effect.

DETAILED DESCRIPTION

Figure 1:
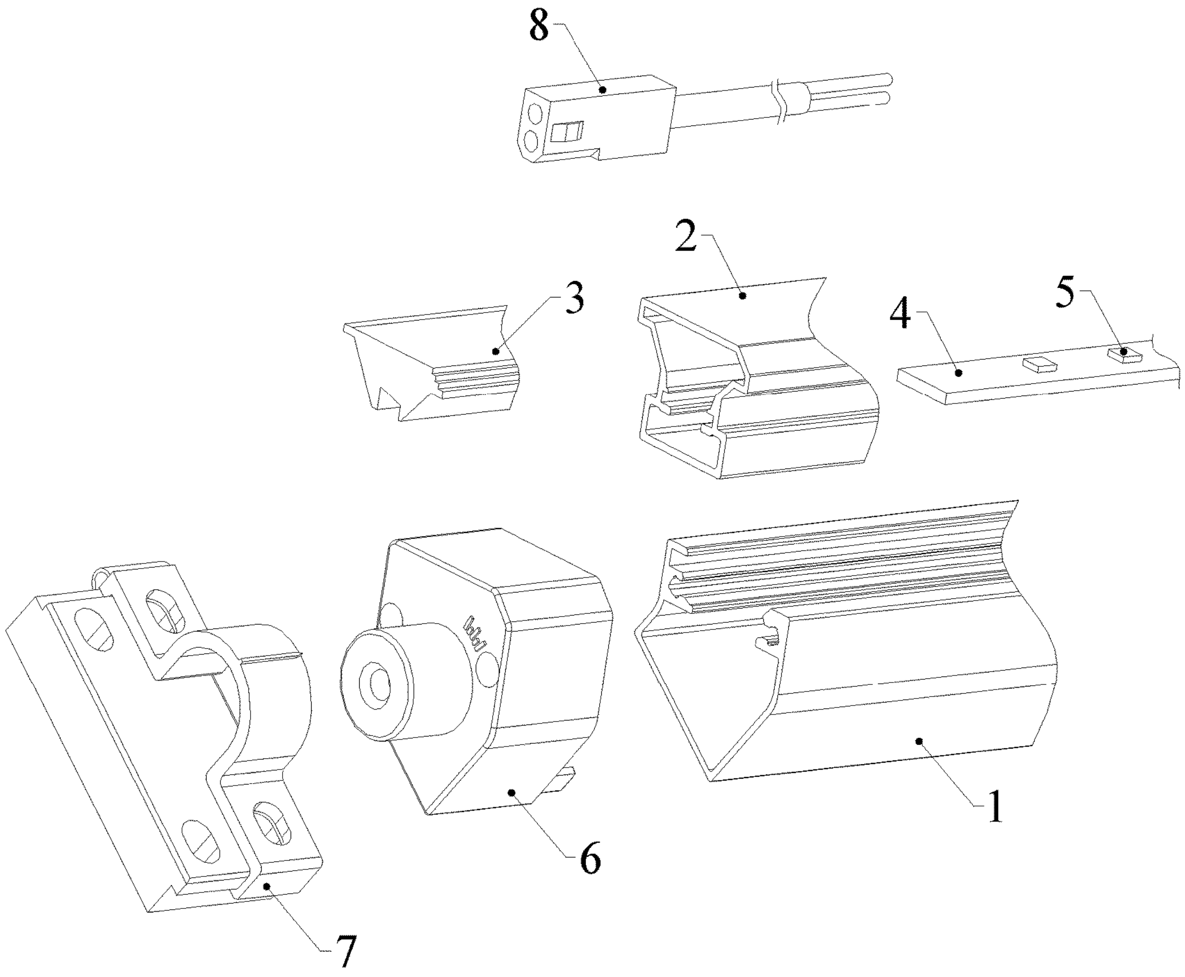
FIG. 1 is an exploded view of a lighting device according to the present disclosure.

The accompanying drawings are for exemplary illustration only, and should not be construed as limitations on the present disclosure. In order to better illustrate the following embodiment, some parts in the accompanying drawings may be omitted, enlarged or reduced, and they do not represent the size of the actual product; for those skilled in the art, it is understandable that certain well-known structures and descriptions thereof in the drawings may be omitted.

FIG. 1 depicts a lighting device 10 applicable for use in a freezer 9 having a freezer body 92 and used for illuminating items on 91 in the freezer body 92. The light device includes a housing 1, a light tube 2, a light-transmitting member 3, a PCB 4, a plurality of light beads 5 on the PCB 4, side covers 6, bases 7 and a power connection line 8. The power connection line 8 is used for connecting the PCB 4 and the plurality of light beads 5 to an external power supply.

Figure 2:
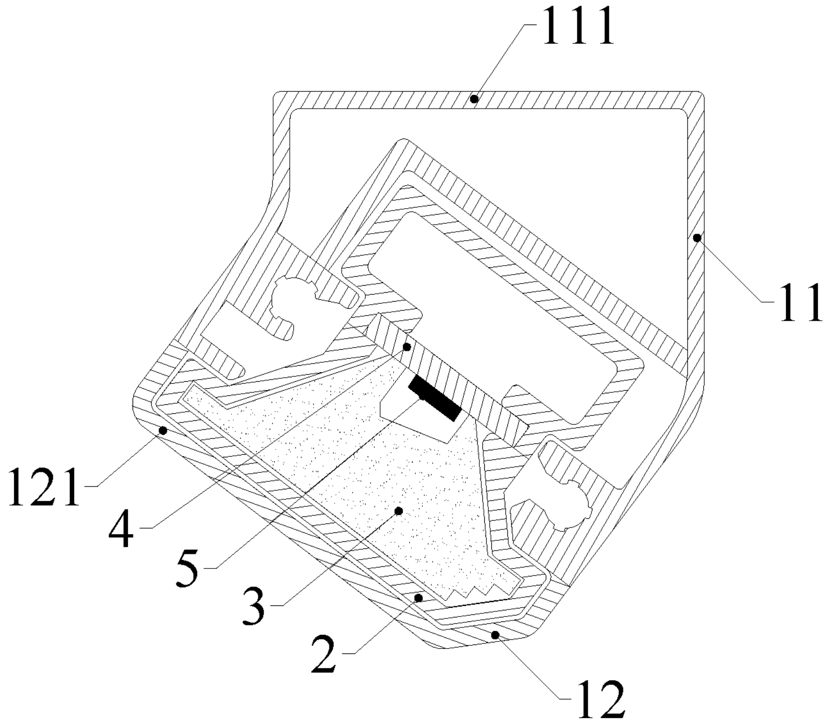
FIG. 2 is a cross-section view of a lighting device according to the present disclosure.

Referring to FIG. 2, the housing 1 includes an upper housing 11 having a housing installing surface 111 and a lower housing 12 having a housing light-emitting surface 121. When in use, the upper housing 11 is mounted and fixed inside the freezer 9. The housing light-emitting surface 121 forms an angle with respect to the housing installing surface 111. Such inclined arrangement is advantageous to save space required for installing the lighting device 10 in the freezer body 92, while achieving a better lighting effect. The light tube 2 is arranged between the upper housing 11 and the lower housing 12.

Figure 3:
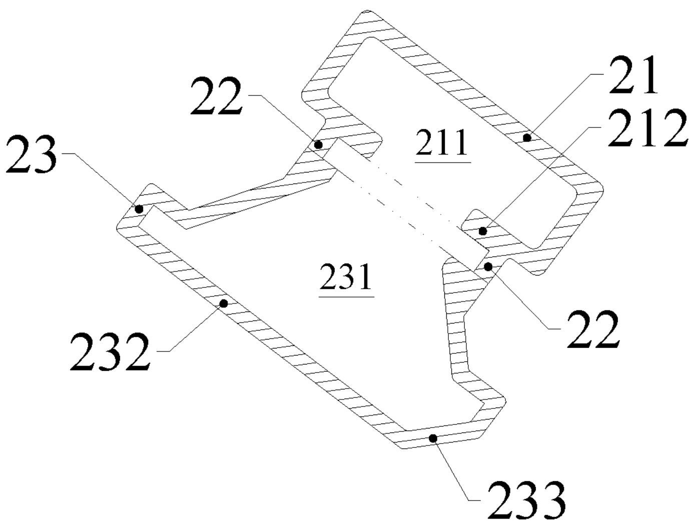
FIG. 3 is a cross-section view of a light tube according to the present disclosure.

In further combination with FIG. 3, the light tube 2 includes a heat dissipation portion 21, a first installing portion 22, and a second installing portion 23. The heat dissipation portion 21 is provided with a heat dissipation cavity 211 for dissipating heat during operation of the light source. The first installing portion 22 is in air communication with the heat dissipation cavity 211 and serves to install the PCB 4. The second installing portion 23 is provided with an installing cavity 231 for installing the light-transmitting member 3.

Figure 4:
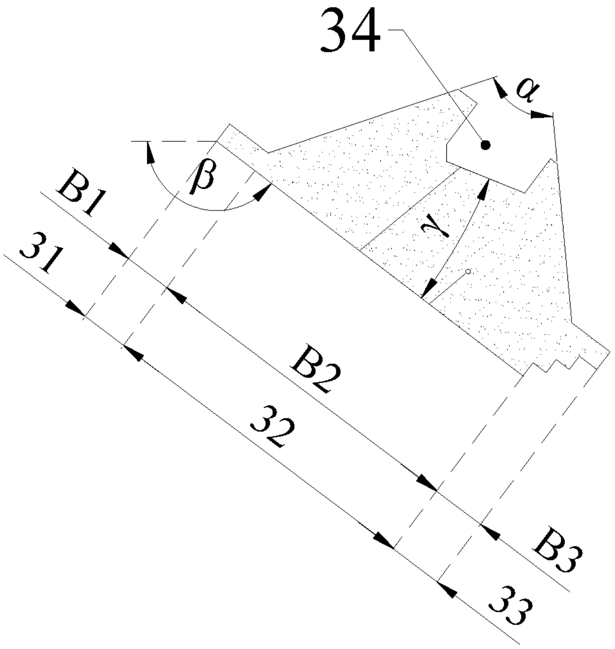
FIG. 4 is a cross-section view of a light-transmitting member according to the present disclosure.
Figure 8:
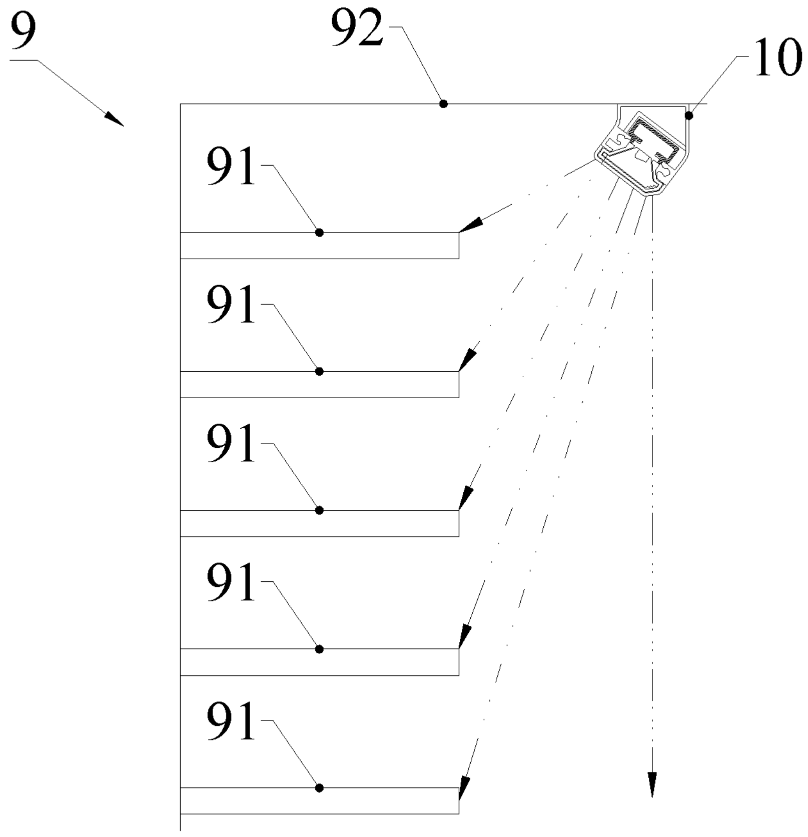
FIG. 8 is a schematic view showing a lighting device in use according to the present disclosure.

The light-transmitting member 3 in the illustrated embodiment is made of a material with LENS optical properties. With regards to FIG. 4 and FIG. 8, the light-transmitting member 3 specifically includes a first light-transmitting portion 31 for irradiating the upper shelves 91 of the freezer 9, a second light-transmitting portion 32 for irradiating the middle shelves 91 of the freezer 9, and a third light-transmitting portion 33 for irradiating the lower shelves 91 of the freezer 9. Particularly, the light-emitting surfaces of the first light-transmitting portion 31 and the second light-transmitting portion 32 are both flat surfaces, while the light-emitting surface of the third light-transmitting portion 33 is in form of a stepped surface. Preferably, the transverse light-emitting width B1 of the first light-transmitting portion 31, the transverse light-emitting width B2 of the second light-transmitting portion 32, and the transverse light-emitting width B3 of the third light-transmitting portion 33 satisfy $B1<B3<B2$. In the embodiment, the light-emitting surfaces of the first light-transmitting portion 31, the second light-transmitting portion 32, and the third light-transmitting portion 33 are all frosted.

In this embodiment, the cross section of the light-transmitting member 3 is substantially in trapezoidal shape, having a narrower upper portion and a wider lower portion. The top of the trapezoid is provided with a groove-shaped light-transmitting cavity 34. The bottom surface of the groove-shaped light-transmitting cavity 34 is inclined relative to the light-emitting surfaces of the first light-transmitting portion 31 and the second light-transmitting portion 32, forming an angle $\gamma=10°-20°$. In addition, after the lighting device 10 is installed to the freezer 9, the bottom surface of the groove-shaped light-transmitting cavity 34 is arranged to extend outward and downward with respect to the shelves 91. Such configuration of the light-transmitting cavity 34 can ensure that more light emitted therethrough will fall into the third light-transmitting portion 33 to emit, thereby boosting the visual effects during irradiating the lower portion of the freezer 9. In order to play full use of the light source at the maximum, the lighting device 10 is preferably arranged on the top surface of the freezer 9 to irradiate the shelves 91 thereof at an angle. The light-transmitting member 3 does this with both sides of the cross section thereof being inclined planes, which can obtain large-angle irradiation while reducing volume of the lighting device 10. The angle formed by the inclined planes of the light-transmitting member 3 is $\alpha=60°-90°$. Moreover, the light-emitting surfaces of the first light-transmitting portion 31 and the second light-transmitting portion 32 are arranged at an angle with respect to the shelves 91 of the freezer 9, preferably with the angle $\beta=130°-150°$.

Referring to FIG. 2 and FIG. 3, consequently, the second installing portion 23 includes a light-transmitting plane 232 parallel to the light-emitting surfaces of the first light-transmitting portion 31 and the second light-transmitting portion 32, such parallel arrangement can effectively reduce the halation, which facilitates uniform light emission. The second installing portion 23 further includes a light-transmitting inclined plane 233 for the third light-transmitting portion 33 to emit light.

Figure 5:
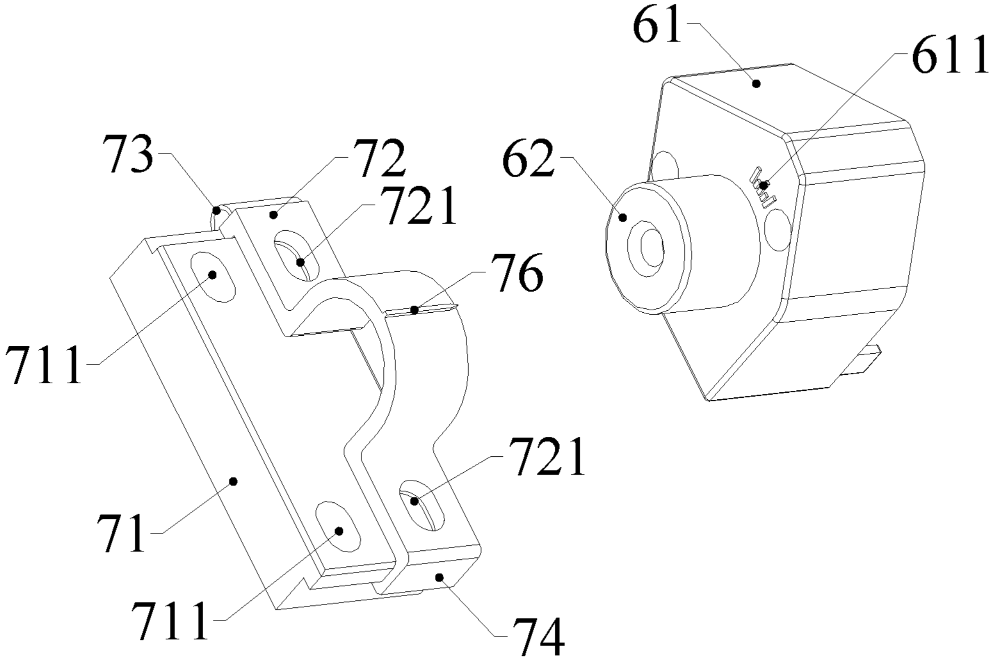
FIG. 5 is a perspective view of a base and a side cover according to the present disclosure.

Referring now to FIG. 5, the lighting device 10 further includes two sets of side covers 6 and bases 7, respectively arranged at both ends of the housing 1. The two side covers 6 are used for sealing the light tube 2, and the light tube 2 is rotatably arranged in the freezer 9 by means of the bases 7. The configuration of the side covers 6 can ensure the tightness of the light tube 2 to achieve dampproof property. With configuration of the bases 7, the lighting device 10 can be rotatably arranged in the freezer 9, which facilitates adjusting the light-emitting angle to be applicable to freezers in different sizes and different models, thus augmenting the adaptability of the lighting device 10.

Specifically, each base 7 includes a base plate 71 and a clamping element 72, and each side cover 6 is arranged between the base plate 71 and the clamping element 72. The clamping element 72 can be formed into a Q-shaped structure. In such case, the light tube 2 is arranged at the arched portion of the Q-shaped structure via the side covers 6, and finally fixed in the freezer 9 through the base plates 71.

Figure 6:
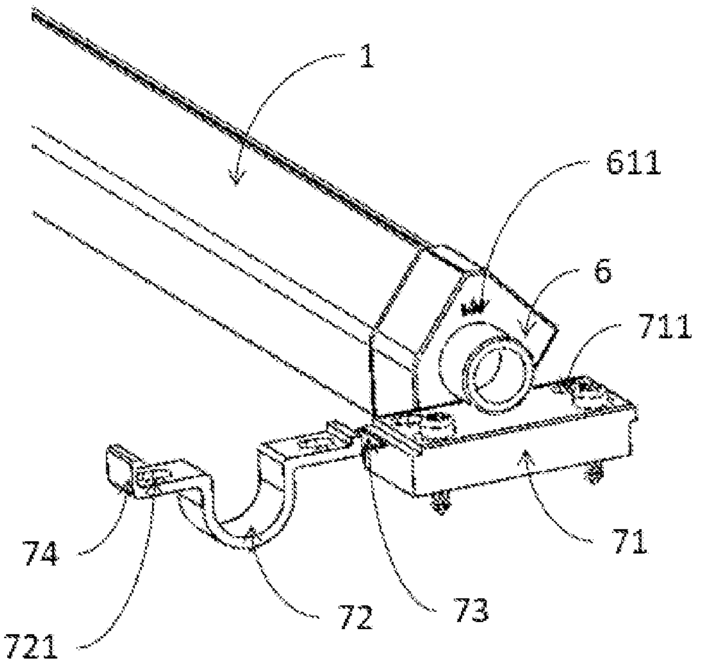
FIG. 6 is a perspective view of a lighting device, showing a base not fastened with a side cover according to the present disclosure.
Figure 7:
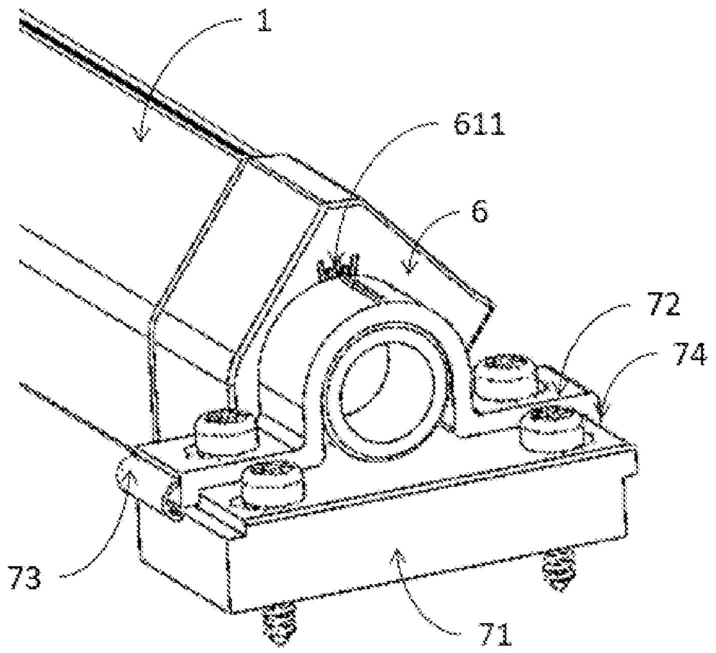
FIG. 7 is a perspective view of a lighting device, showing a base fastened with a side cover according to the present disclosure.

In combination with FIG. 6 and FIG. 7, the base plate 71 and the clamping element 72 are connected on one side by a flexible element 73, and fastened on the other side by a fastener 74. In such configuration, during mounting, it is only needed to fix the base plate 71 to the freezer 9 first, and then place the light tube 2 between the base plate 71 and the clamping element 72, and finally both hands can be released after the fastener 74 is fastened. To further ensure the fixing effect, the base plate 71 can be provided with four screw holes 711, two screw holes 711 are used for fixing the base plate 71 to the freezer 9, and the other two screw holes 711 are used for cooperating with screw holes 721 of the clamping element 72. By fastening with screws, the light tube 2 is rotatably arranged on the bases 7.

In combination with FIG. 5 and FIG. 7, each side cover 6 includes a cap 61 and a rotating shaft 62. The rotating shaft 62 is rotatably arranged between the base plate 71 and the clamping element 72. The cap 61 has a scale mark 611 arranged on the side surface thereof, the clamping element 72 is correspondingly provided with an indentation portion 76 coordinated with the scale mark 611. In this way, after installation, by rotating the side cover 6 and the light tube 2, the position of the indentation portion 76 pointing to the scale mark 611 will change, such as with scales at an interval of 5°, making the angle to be adjusted be seen visually through the scale.

According to the present embodiment, the third light-transmitting portion 33 of the stepped structure can realize light superposition and enhanced illumination, with visual effects of light spots in multiplier increase, the lighting effect at the lower portion of the freezer 9 comparable to that on the middle and upper portion thus can be achieved, making the items in the freezer 9 irradiated more evenly, which is exceedingly convenient for users. During installation, no more person is needed to cooperate for installation, and only one person can finish installation of the lighting device 10 independently. Specifically, the bases 7 are firstly fixed to the freezer body 92, then the side covers 6 and the light tube 2 which are assembled are placed together between the base plate 71 and the clamping element 72 of each base, during which the light tube 2 is held by one hand and the clamping elements 74 of the bases at both ends are fastened by the other hand, and finally the clamping element 72 and the base plate 71 are fastened with screws. Such easy way makes installation of the lighting device 10 convenient and fast. When the position of the shelves 91 is adjusted, in order to achieve a better illumination effect, the housing can be rotated by the user to adjust the light-emitting angle at any time to achieve the optimal illumination effects.

Obviously, the above-mentioned embodiment of the present disclosure is only an example for clearly illustrating the embodiment of the present disclosure, rather than limiting the specific implementation modes of the present disclosure. Any modifications, equivalent replacements and improvements made within the spirit and principles of claims of the present disclosure shall be contained within the protection scope of the claims of the present disclosure.

What is claimed is:

1. A lighting device for a freezer, comprising a housing, a light source arranged in the housing, and a light-transmitting member arranged within a light-emitting range of the light source, wherein the light-transmitting member comprises:

a first light-transmitting portion for irradiating an upper portion of the freezer;

a second light-transmitting portion for irradiating a middle portion of the freezer; and a third light-transmitting portion for irradiating a lower portion of the freezer, wherein both the first light-transmitting portion and the second light-transmitting portion have flat light-emitting surfaces and the third light-transmitting portion has a stepped light-emitting surface, and wherein a transverse light-emitting width B1 of the first light-transmitting portion, a transverse light-emitting width B2 of the second light-transmitting portion, and a transverse light-emitting width B3 of the third light-transmitting portion satisfy B1<B3<B2.

2. The lighting device according to claim 1, wherein both the light-emitting surfaces of the first light-transmitting portion, the second light-transmitting portion, and the third light-transmitting portion are all frosted.

3. The lighting device according to claim 1, wherein a cross section of the light-transmitting member is of a structure with a narrower upper portion and a wider lower portion, the upper portion of the light-transmitting member is provided with a light-transmitting cavity for accommodating the light source, and a bottom surface of the light-transmitting cavity and the light-emitting surfaces of the first light-transmitting portion and the second light-transmitting portion forms an angle between 10° and 20°.

4. The lighting device according to claim 1, wherein the lighting device further comprises a light tube arranged in the housing, which comprises a heat dissipation portion, which is provided with a heat dissipation cavity for dissipating heat during operation of the light source;

a first installing portion, which is in air communication with the heat dissipation cavity and configured to install the light source; and a second installing portion, which is provided with an installing cavity for installing the light-transmitting member, and has a flat light-transmitting surface parallel to the first light-transmitting portion and the second light-transmitting portion and an inclined light-transmitting surface for the third light-transmitting portion to emit light.

5. The lighting device according to claim 4, further comprising two sets of side covers and bases, each set being arranged at each end of the housing, wherein the side covers are used for sealing the light tube, and the light tube is rotatably arranged in the freezer by the bases.

6. The lighting device according to claim 5, wherein each base comprises a base plate and a clamping element, and each side cover is arranged between the base plate and the clamping element.

7. The lighting device according to claim 6, wherein the base plate and the clamping element are connected on one side by a flexible element and fastened on the other side by a fastener.

8. The lighting device according to claim 6, wherein each side cover comprises a cap and a rotating shaft rotatably arranged between the base plate and the clamping element, and wherein the cap has a scale mark arranged on a side surface thereof, and the clamping element is correspondingly provided with an indentation portion cooperating with the scale mark.

9. The lighting device according to claim 1, wherein the housing comprises a first housing having a housing installing surface and a second housing having a housing light-emitting surface, the housing light-emitting surface is arranged in an inclined way relative to the housing installing surface.

10. A freezer, comprising a freezer body, shelves inside the freezer body, and a lighting device for irradiating the shelves, wherein the lighting device comprises a housing, a light source arranged in the housing, and a light-transmitting member arranged within a light-emitting range of the light source, wherein the light-transmitting member comprising:

a first light-transmitting portion for irradiating an upper portion of the freezer;

a second light-transmitting portion for irradiating a middle portion of the freezer; and a third light-transmitting portion for irradiating a lower portion of the freezer, wherein the first light-transmitting portion and the second light-transmitting portion have flat light-emitting surfaces, and the third light-transmitting portion has a stepped light-emitting surface, and wherein a transverse light-emitting width B1 of the first light-transmitting portion, a transverse light-emitting width B2 of the second light-transmitting portion, and a transverse light-emitting width B3 of the third light-transmitting portion satisfy B1<B3<B2.

11. The freezer according to claim 10, wherein the lighting device is provided on a top of the freezer body, and the light-emitting surfaces of the first light-transmitting portion and the second light-transmitting portion is arranged in an inclined way relative to the shelves.

12. The freezer according to claim 11, wherein an inclined angle between the light-emitting surfaces of the first light-transmitting portion and the second light-transmitting portion and the shelves is between 1300 to 150°.

13. The freezer according to claim 10, wherein the third light-transmitting portion has 2-5 steps.

14. The freezer according to claim 10, wherein a cross section of the light-transmitting member is of a structure with a narrower upper portion and a wider lower portion, the upper portion of the light-transmitting member is provided with a light-transmitting cavity for accommodating the light source, and a bottom surface of the light-transmitting cavity and the light-emitting surfaces of the first light-transmitting portion and the second light-transmitting portion forms an angle between 10° and 20°.

15. The freezer according to claim 10, wherein a bottom surface of the light-transmitting cavity is arranged to extend outward and downward relative to the shelves.

16. The freezer according to claim 10, wherein a transverse light-emitting width B1 of the first light-transmitting portion, a transverse light-emitting width B2 of the second light-transmitting portion, and a transverse light-emitting width B3 of the third light-transmitting portion satisfy $B1<B3<B2$.

17. The freezer according to claim 10, wherein the lighting device further comprises a light tube arranged in the housing, which comprises a heat dissipation portion, which is provided with a heat dissipation cavity for dissipating heat during operation of the light source;

a first installing portion, which is in air communication with the heat dissipation cavity and configured to install the light source; and a second installing portion, which is provided with an installing cavity for installing the light-transmitting member, and has a flat light-transmitting surface parallel to the first light-transmitting portion and the second light-transmitting portion and an inclined light-transmitting surface for the third light-transmitting portion to emit light.

18. A method of use of the lighting device according to claim 1, comprising rotatably fixing the lighting device to the freezer to make the light-emitting surfaces of the first light-transmitting portion and the second light-transmitting portion in an inclined angle relative to the shelves.

19. The method according to claim 18, wherein the inclined angle between the light-emitting surfaces of the first light-transmitting portion and the second light-transmitting portion and the shelves is between 130° to 150°.

* * * * *